United States Patent [19]

Takeda et al.

[11] Patent Number: 4,938,566
[45] Date of Patent: Jul. 3, 1990

[54] DISPLAY APPARATUS

[75] Inventors: Etsuya Takeda, Suita; Yutaka Nanno, Neyagawa; Takao Kawaguchi, Hirakata; Seiichi Nagata, Sakai, all of Japan

[73] Assignee: Matsushita Electric Industrial Co., Ltd., Kadoma, Japan

[21] Appl. No.: 243,860

[22] Filed: Sep. 13, 1988

[30] Foreign Application Priority Data

Sep. 14, 1987 [JP] Japan ................................ 62-230103

[51] Int. Cl.$^5$ ................................................ G02F 1/13
[52] U.S. Cl. ..................................... 350/332; 350/333; 350/334
[58] Field of Search ....................... 350/332, 333, 334; 340/784

[56] References Cited

U.S. PATENT DOCUMENTS

| | | | |
|---|---|---|---|
| 4,386,352 | 5/1983 | Nonomura et al. | 340/784 |
| 4,586,039 | 4/1986 | Nonomura et al. | 340/784 |
| 4,651,148 | 3/1987 | Takeda et al. | 340/784 X |
| 4,680,580 | 7/1987 | Kawahara | 340/784 |

FOREIGN PATENT DOCUMENTS

| | | | |
|---|---|---|---|
| 0112700 | 7/1984 | European Pat. Off. | 350/333 |
| 0094736 | 5/1984 | Japan | 350/332 |
| 0119329 | 7/1984 | Japan | 350/332 |
| 0273838 | 11/1988 | Japan | 340/784 |
| 2034953 | 6/1980 | United Kingdom | 340/784 |
| 2133602 | 7/1984 | United Kingdom | 340/784 |

Primary Examiner—Andrew J. James
Assistant Examiner—Huy K. Mai
Attorney, Agent, or Firm—Cushman, Darby & Cushman

[57] ABSTRACT

In an electro-optical effect display apparatus, a number of pairs of two parallel and closely disposed scanning bus-lines (21-21, 21-21, ...) are disposed on a substrate with a predetermined interval therebetween, and a first electrode bus-line (25) is disposed between each other neighboring two pairs of the scanning bus-lines (21-21 and 21-21). Then respective storage capacitors (26) belonging to two display elements (24, 24), each other neighboring with respect to the first electrode bus-line (25), are connected commonly to the first electrode bus-line (25), thereby utilizing a single first electrode bus-line (25) commonly for two storage capacitors (26, 26) which are disposed substantially symmetrically to the first electrode bus-line (25); and thus, the number of bus-lines can be reduced, and consequently, the area of the display element increases.

12 Claims, 16 Drawing Sheets

DISPLAY APPARATUS

FIELD OF THE INVENTION AND RELATED ART STATEMENT

1. Field Of The Invention

The present invention relates generally to a display apparatus, and more particularly to an electro-optical display apparatus, and more particularly to an electro-optical effect display apparatus which is driven through a switching device utilizing a non-linear characteristic of voltage versus current.

2. Description Of The Related Art

FIG. 3(a) shows an equivalent circuit of an electro-optical effect display apparatus which is similar to an actual display apparatus as shown in FIG. 4, using a diode as a switching device in the general art. Referring to FIG. 3(a), scanning bus-lines 21 are horizontally disposed on a substrate with a predetermined interval, and signal bus-lines 22 are vertically disposed with substantially the same interval as the scanning bus-lines 21. The signal bus-lines 22 are insulated from the scanning bus-lines 21 at the respective crossing portions. A diode 23, having non-linear characteristics in voltage versus current, is connected in series with a display element 24 such as liquid crystal element utilizing an electro-optical effect. The diode 23 is coupled at the other terminal to the scanning bus-lines 21, and the display element 24 is coupled at the other terminal to the signal bus-line 22. Each set comprising the diode 23 and the display element 24 constitute a pixel. When a driving voltage across the scanning bus-line 21 and the signal bus-line 22 exceeds a threshold voltage of the diode 23, a driving voltage is applied to the display element 24, and the optical characteristic thereof is changed so as to be visually distinguishable.

In general, the electro-optical effect display element is a capacitive device, and there is a possibility of dispersion of capacitance thereof. Moreover, the diodes of respective pixels may have different threshold voltages from each other. Consequently, uniformity and stability of display is hard to maintain.

In order to eliminate the above-mentioned disadvantage, a well-known storage capacitance 26 is connected across the junction of the diode 23 and display element 24 and a first electrode bus-line 25, which is disposed in parallel with the scanning bus-line as shown in FIG. 3(b). The storage capacitance 26 is connected substantially in parallel with the display element 24 in a control circuit, and the composite capacitance between the junction and the signal bus-line increases. Thus, an apparent dispersion of the capacitance of the display element is reduced. However, in the above-mentioned general art, the number of necessary bus-lines increases by addition of the first electrode bus-line 25. For example, five bus-lines are required for two display elements surrounded by an alternate long and short dash line A as shown in FIG. 3(b).

The diode is not the optimum device for the electro-optical effect display apparatus because of its large capacitance. A transistor such as "thin film transistor" is usable for the switching device utilizing non-linear characteristics of voltage versus current as shown in FIG. 3(c). In the example, a second electrode bus-line 50 is further required for connecting the display element. A transistor 31 is selected by the scanning bus-line 21 and the signal bus-line 22, and is driven by application of a voltage across the gate and source thereof.

In the example of FIG. 3(c), six bus-lines are required for two display elements surrounded by an alternate long and short dash line A.

The electro-optical effect display apparatus is formed on one substrate in PLZT type by insulating the signal bus-lines from the scanning bus-lines at the crossing portions. On the other hand, in the electro-optical effect display apparatus using liquid crystal, the horizontal bus-lines such as the scanning lines 21 and the first electrode bus-lines 25 are formed on one substrate, and the vertical bus-lines of the signal bus-lines and the second electrode bus-lines are formed on the other or second substrate. In case that a transistor is used as the switching device, only a transparent electrode as the second electrode bus-line 50 is formed on the second substrate.

In the example as shown in FIG. 3(c), at an instant of operation of the display apparatus, for example, two driving voltages which are in opposite phase relation to each other are applied across the signal bus-line 22 and the first electrode bus-line 25, and also across the second electrode bus-line 50 and the signal bus-line 22. For example, a negative driving voltage is applied across the signal bus-line 22 and the scanning bus-line 21, and a positive driving voltage is applied across the second electrode bus-line 50 and the scanning bus-line 21. Consequently, the power source of a relatively lower voltage is usable to the display apparatus, and power consumption is reduced. Such driving method is disclosed in the prior arts of the Japanese published unexamined patent applications Sho 54-98525 and Sho 57-67993, and is called as "opposite phase driving".

On the other hand, in case that a capacitor 26 is short-circuited, the display element 24 connected to the short-circuited capacitor 26 goes to a transparent state or an opaque state, corresponding to a voltage applied across the first electrode bus-line 25 and second electrode bus-line 50. In general, a display element is conspicuous when it is transparent as a result of malfunction. Therefore, it is desirable that the display element in malfunction is opaque. The display element in the malfunction state can be made by applying such a voltage to the first electrode bus-line 25 and to the second electrode bus-line 50 that brings the display element in "normally black operation".

FIG. 4 is an example of an actual circuit pattern of the electro-optical effect display apparatus of PLZT type as shown in FIG. 3(c). Referring to FIG. 4, the thin film transistor 31 comprises a semiconductor layer 44, the signal bus-line 22, the scanning bus-line 21 and an electrode 41 connected to the display element 24 with a contact part 45. The storage capacitor 26 is constituted by the first electrode bus-line 25, an electrode 43 and a dielectric material layer (not shown) sandwiched between the scanning bus-line 21 and the electrode 43. The electrode 43 is connected to the display element 24 with contact parts 45. The display element 24 is connected to the second electrode bus-line 50 at contact parts (not shown).

In the above-mentioned electro-optical effect display apparatus of the general art, an area of the display element 24 is limited by occupied areas of the scanning bus-line 21, the signal bus-line 22, the first electrode bus-line 25 and the second electrode bus-line 50. It is desirable that the area of the display element 24 is larger in comparison with the total areas of these bus-lines. In order to realize the above-mentioned requirement, reduction of the bus-lines is effective. In order to reduce bus-lines, it is known that a storage capacitance 26 is connected across a neighboring scanning bus-line and the junction of the transistor and the display element as shown in FIG. 3(d). In this example five bus-lines are used for two display elements, or shown by an alternate long and short dash line A in FIG. 3(d). However, in this configuration, a higher driving voltage is required in comparison with the example as shown in FIG. 3(c), since the "opposite phase driving voltages" are not applicable to the display element. Moreover, a display element in malfunction cannot be held opaque, and hence, the defective display element is conspicuous, hence making the total display unclear.

OBJECT AND SUMMARY OF THE INVENTION

An object of the present invention is to provide an electro-optical effect display apparatus wherein the number of bus-lines is reduced and hence the area of the display element is enlarged.

The electro-optical effect display apparatus in accordance with the present invention comprises:

a plurality of first bus-lines disposed horizontally on a substrate with a predetermined interval, a plurality of second bus-lines disposed vertically on the substrate electrically insulated from the first bus-lines at respective crossings with another predetermined interval, a first electrode bus-line respectively disposed between the neighboring two first bus-lines, a second electrode bus-line respectively disposed parallelly and adjacent to the second bus-lines elelctrically insulated from the first bus-lines at the crossings, a non-linear device having non-linear voltage-current characteristic disposed substantially adjacent to an area surrounded by the second bus-line, the first bus-line, the first electrode bus-line and the second electrode bus-line, and controlled by the second bus-line and the first bus-line, an electro-optical element disposed in the area and connected between the non-linear device and the second electrode bus-line to be controlled by the non-linear device, and a storage capacitor disposed adjacent to area, and connected across the first electrode bus-line and the junction between the non-linear device and the electro-optical element.

According to the present invention, the proportion of the total area of the display elements to the area of the display apparatus is increased because of the reduction in bus-lines.

While the novel features of the invention are set forth particularly in the appended claims, the invention, both as to organization and content, will be better understood and appreciated, along with other objects and features therof, from the following detailed description taken in conjunction with the drawings.

DESCRIPTION OF THE PREFERRED EMBODIMENT

Figure 1A:
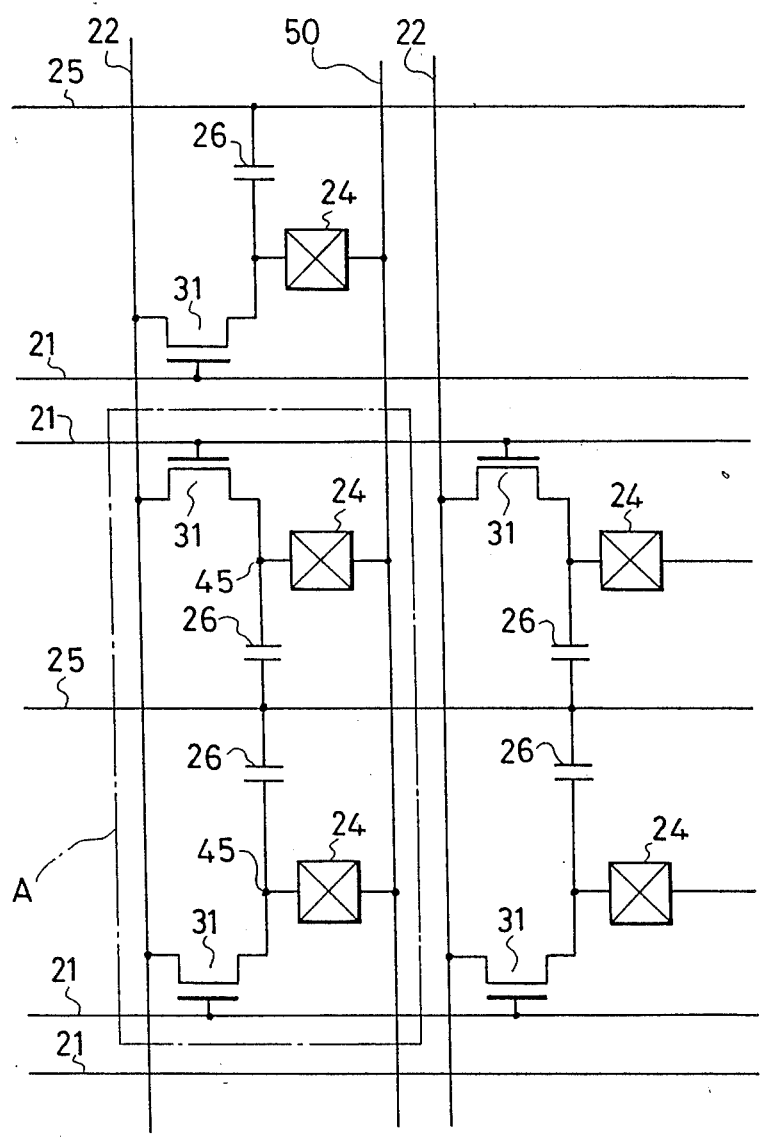
FIG. 1(a) is an equivalent circuit of a first embodiment in accordance with the present invnention.
Figure 2A:
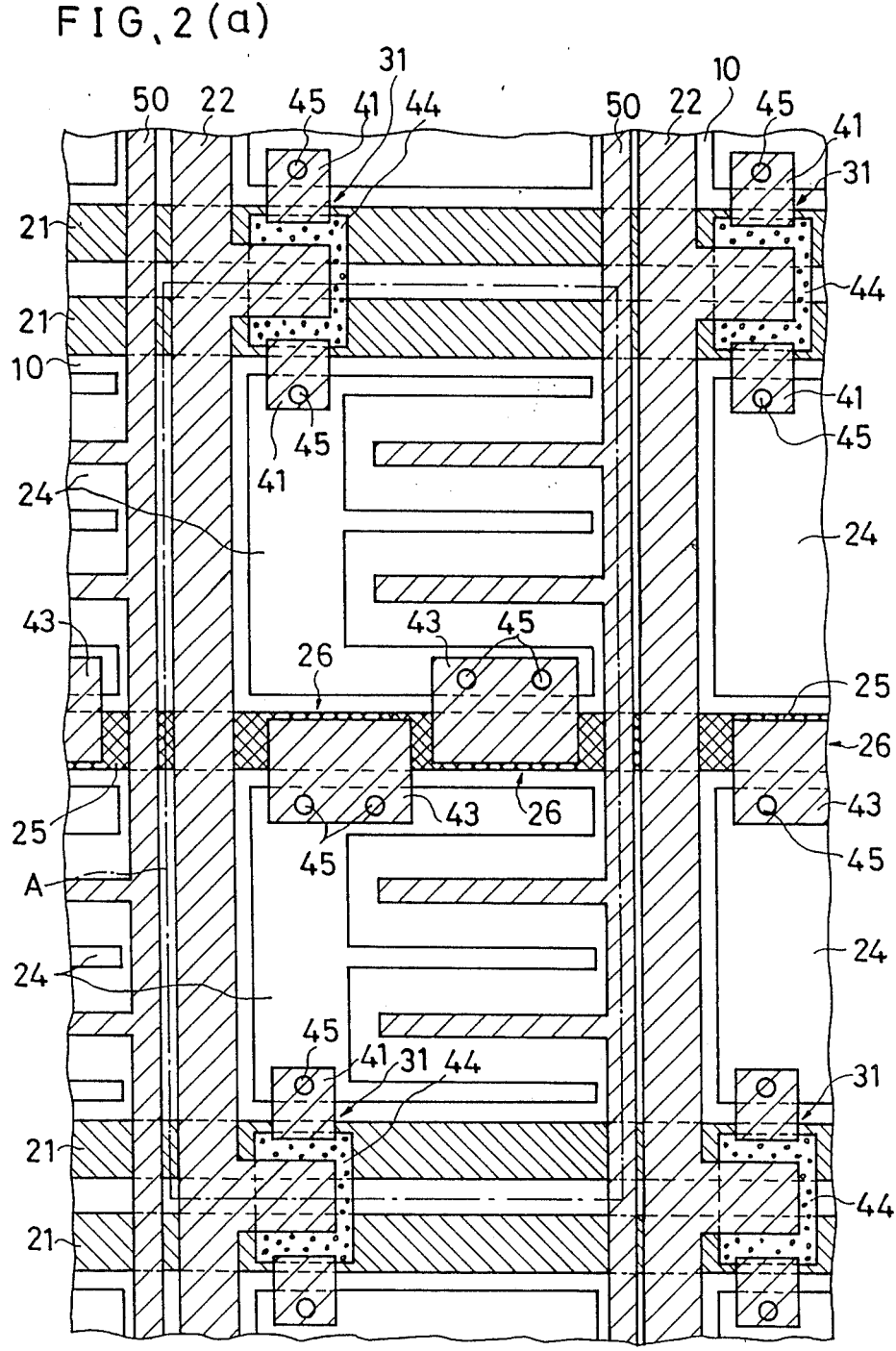
FIG. 2(a) is a plan view of the actual display aparautus of the first embodiment.
Figure 2:
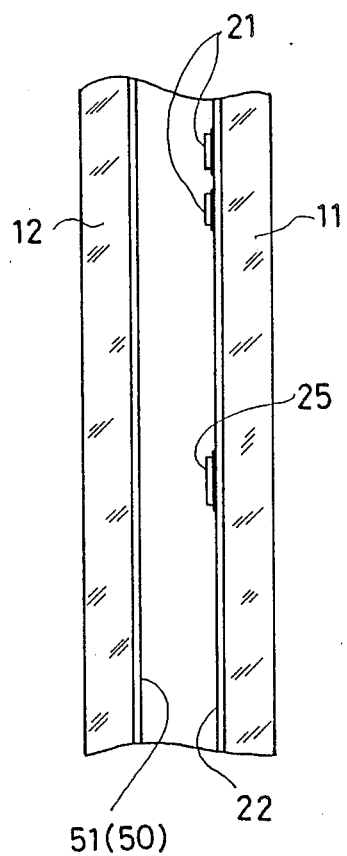
FIG. 2(b) is a side view of substrates of the display apparatus using liquid crystal as a display element.
FIG. 2(c) is a plan view of the actual display apparatus of the equivalent circuit as shown in FIG. 1(e)

FIG. 1(a) shows an equivalent circuit of an electro-optical effect display apparatus of a first embodiment in accordance with the present invention as shown in FIG. 2(a). Referring to FIG. 1(a), plural pairs of two parallel scanning bus-lines 21 which are close together are disposed horizontally on a substrate with a predetermined interval, and a plurality of signal bus-lines 22 are vertically disposed with a predetermined interval. First electrode bus-lines 25 are disposed between a pair of parallel scanning bus-lines 21 and an other pair of parallel scanning bus-lines 21 neighboring to each other. Second electrode bus-lines 50 are disposed adjacent to the signal bus-lines 22. The signal bus-lines 22 and the second electrode bus-lines 50 are insulated from the scanning bus-lines 21 and the first electrode bus-lines 25 at the respective crossing portions.

In each display portion, a transistor 31 such as thin film transistor which is a non-linear device, having non-linear characteristics in voltage versus current, is coupled at the gate to the scanning bus-line 21, and is coupled at the source to the signal bus-line 22. A display element 24 of electro-optical effect display element of PLZT type is connected between the drain of the transistor 31 and the second electrode bus-line 50. A storage capacitance 26 is connected across the junction of the transistor 31 and the display element 24 and the first electrode bus-line 25. The other set, composed of a transistor 31, a display element 24 and a storage capacitance 26, is disposed symmetrically with respect to the first electrode bus-line 25.

FIG. 2(a) shows a part of an actual circuit pattern of the electro-optical effect display apparatus of PLZT type as shown in FIG. 1(a). Referring to FIG. 2(a), the thin film transistor 31 is composed of a semiconductor layer 44, the signal bus-line 22, the scanning bus-line 21 and an electrode 41 connected to the display element 24 with a contact portion 45. The storage capacitor 26 is composed of the first electrode bus-line 25, an electrode 43 and a dielectric material layer (not shown) sandwiched between the first electrode bus-line 25 and the electrode 43. The electrode 43 of the storage capacitor 26 is coupled at contact portions 45 to one electrode of the display element 24, and the other electrode (not shown) of the display element 24 is coupled to the second electrode bus-line 50.

Figure 1B:
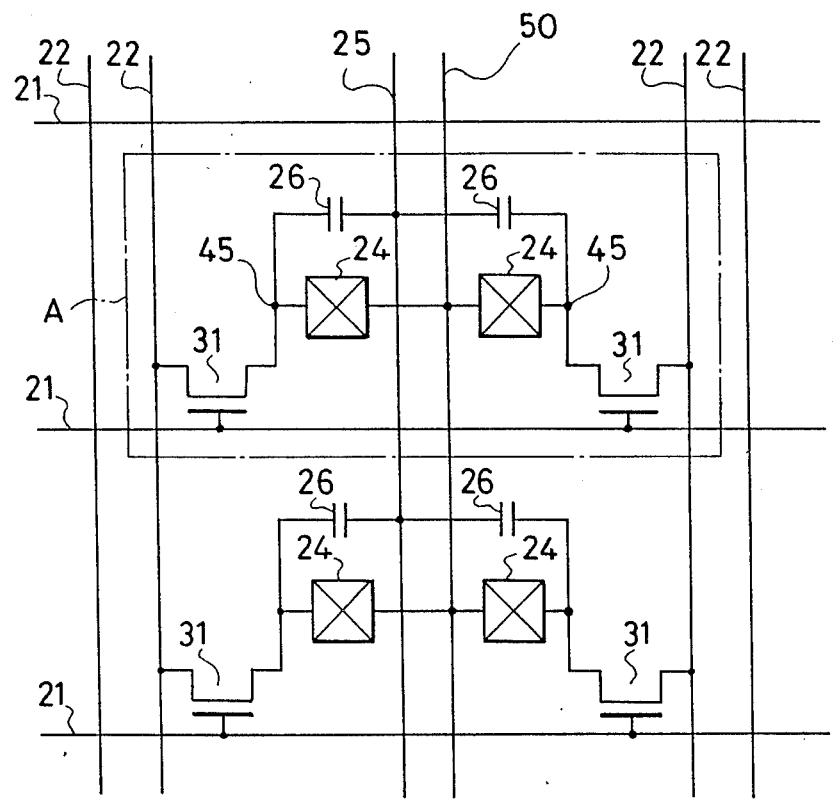
FIG. 1(b) is an equivalent circuit of a second embodiment in accordance with the present invention.

FIG. 1(b) shows an equivalent circuit of a second embodiment of the electro-optical effect display apparatus in accordance with the present invention. In the second embodiment, the second electrode bus-line 50 is disposed in parallel and adjacent to the first electrode bus-line 25.

Figure 3:
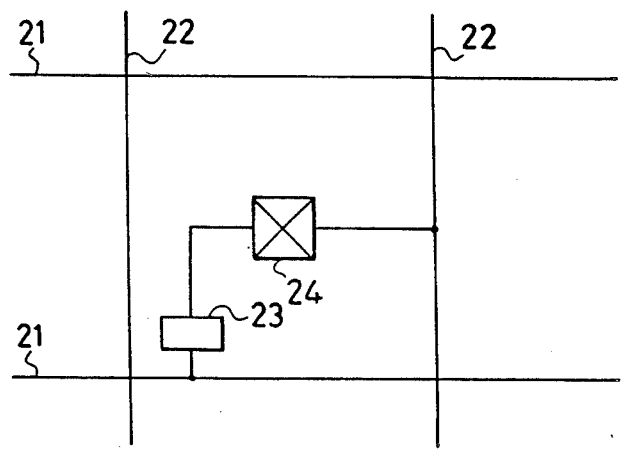
FIG. 3(a) is the equivalent circuit of the first example of the display apparatus in the general art.
FIG. 3(b) is the equivalent circuit of the second example of the display apparatus in the general art.
FIG. 3(c) is the equivalent circuit of the third example of the display apparatus in the general art.
FIG. 3(d) is the equivalent circuit of the fourth example of the display apparatus in the general art.
Figure 3B:
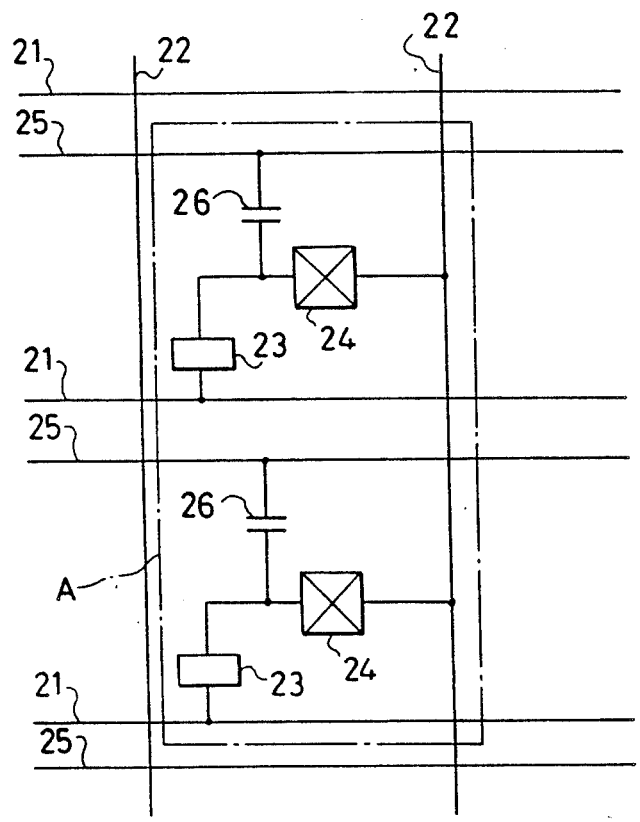
Figure 3C:
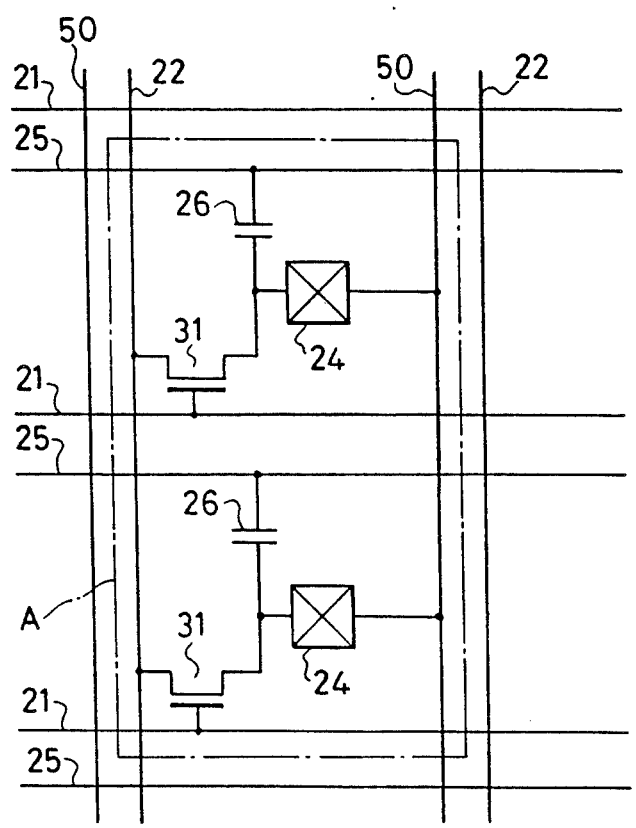
Figure 3D:
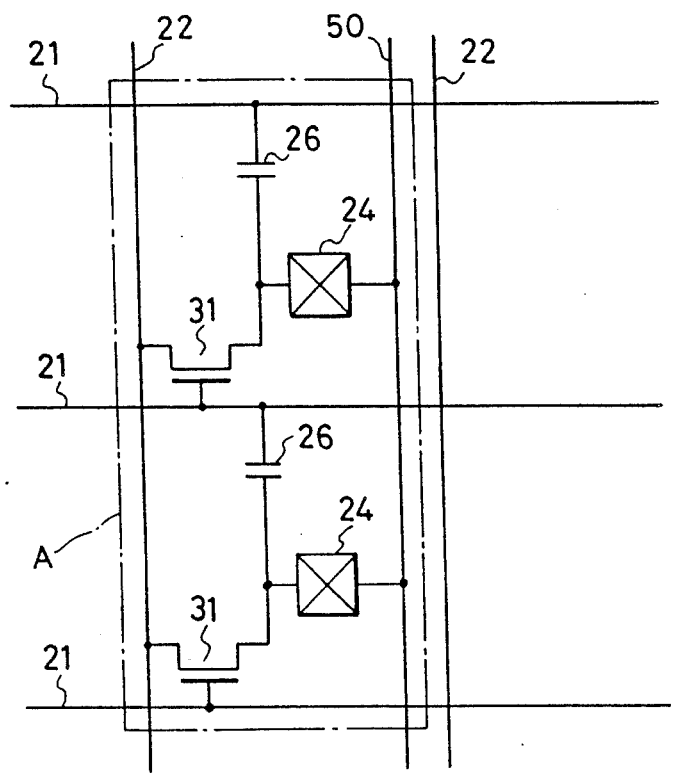
Figure 4:
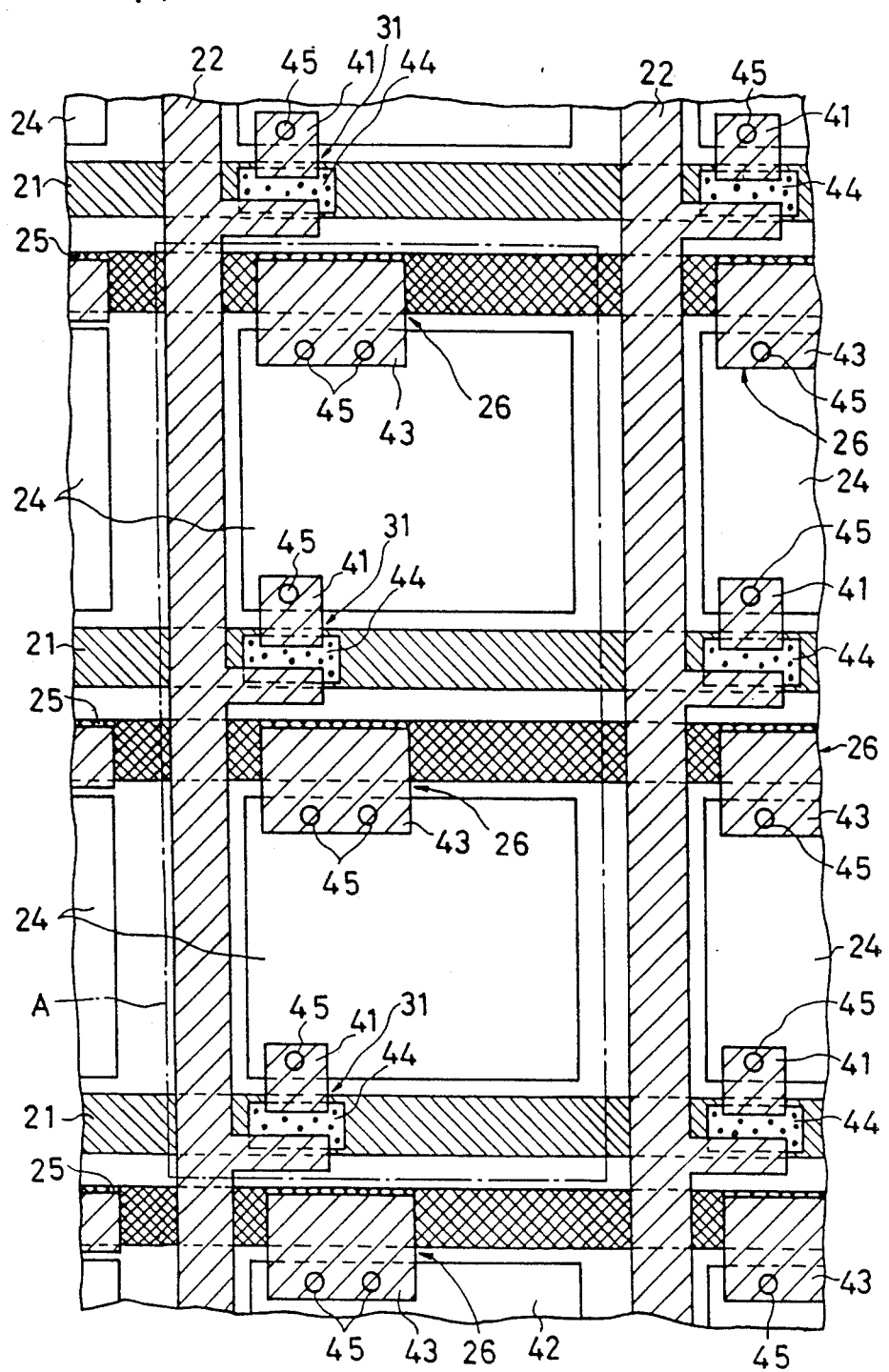
FIG. 4 is the plan view of the actual display apparatus of the third example.

In these first and second embodiments, two scanning bus-lines 21, one signal bus-line 22, on first electrode bus-line 25 and one second electrode bus-line 50 are used for two display elements as shown by an alternate long and short dash line A in FIG. 1(a) and FIG. 1(b). Thus, five bus-lines in total are used for the present display in contrast to the use of six bus-lines for two display elements in the example of the general art as shown in FIG. 3(c). According to the present invention, one bus-line is reduced. Consequently, the area of the display element 24 as shown in FIG. 2(a) increases. The percentage of the total area of the display elements 24 in the area of all the display apparatus is about 43%, in the example of the general art as shown in FIG. 3(c). On the other hand, the percentage of the total area of all the display elements 24 with respect to the area of the display apparatus reaches 48% in the embodiments of the present invention. Consequently, higher quality image is realized in the display apparatus according to the present invention.

Figure 1C:
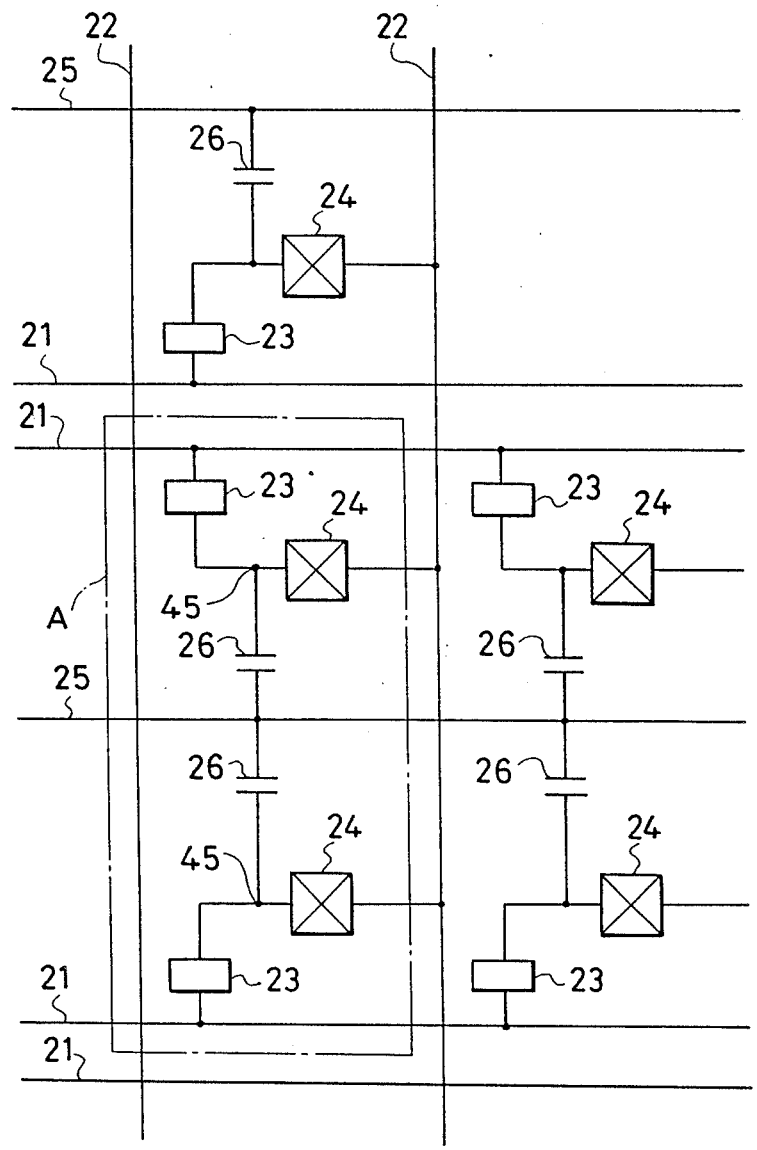
FIG. 1(c) is an equivalent circuit of a third embodiment in accordance with the present invention.

FIG. 1(c) shows an equivalent circuit of a third embodiment of the present invention. In the embodiment, arrangement of the scanning bus-lines 21, the signal bus-lines 22 and the first electrode bus-lines 25 is substantially identical with that of the first embodiment as shown in FIG. 1(a), but a second electrode bus-line is not provided. A diode 23 and a display element 24 which are connected in series to each other are coupled across the scanning bus-line 21 and the signal bus-line 22. The diode 31 serves the same function as a non-linear device having non-linear characteristics in voltage versus current. A storage capacitance 26 is coupled across the junction of the diode 23 and display element 24 and the first electrode bus-line 25. According to the embodiment, four bus-lines of two scanning bus-lines 21, one signal bus line 22 and one electrode bus-line 25 are provided for two display elements surrounded by an alternate long and short dash line A. On the other hand, in the general art as shown in FIG. 3(b), which is equivalent to the third embodiment of the present invention as shown in FIG. 1(c), five bus-lines of two scanning bus-lines 21, one signal bus-line 22 and two first electrode bus-lines 25 are used. Accordingly, one bus-line is reduced in the third embodiment of the present invention. The advantage of the reduction of the bus-line is similar to that of the first embodiment.

Figure 1D:
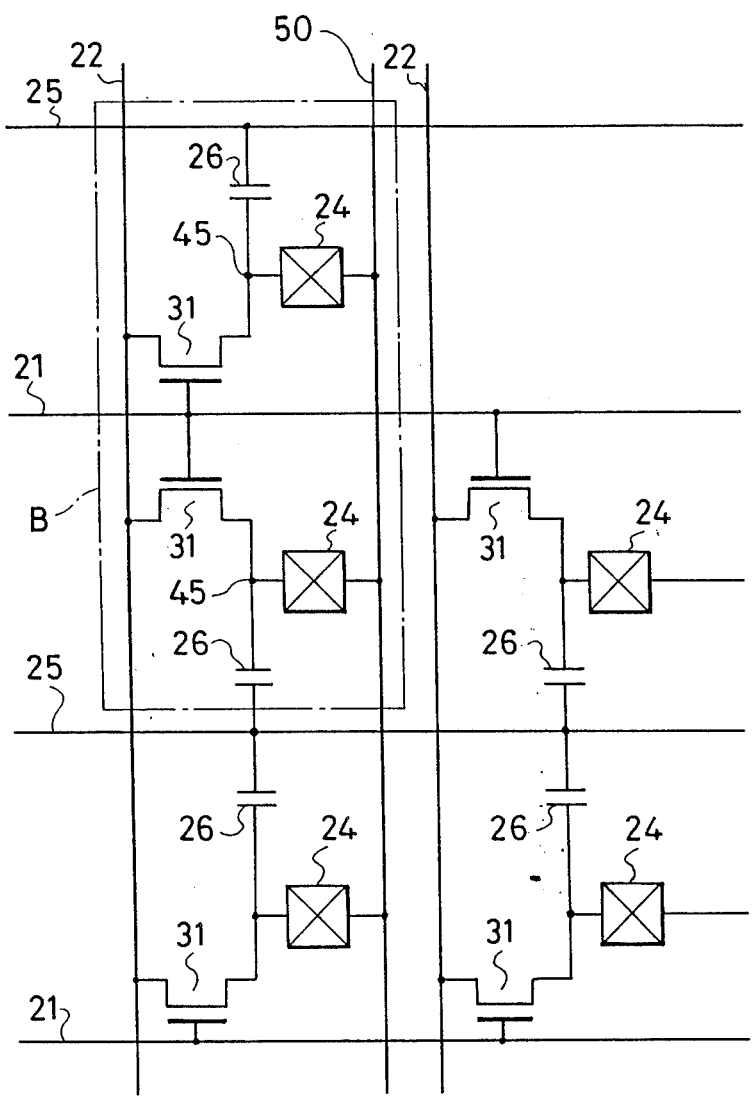
FIG. 1(d) is an equivalent circuit of a fourth embodiment in accordance with the present invention.

FIG. 1(d) shows an equivalent circuit of a fourth embodiment in accordance with the present invention. In the embodiment, a plurality of scanning bus-lines 21 are horizontally disposed on a substrate with a predetermined interval. A first electrode bus-line 25 is disposed between neighboring two scanning lines 21. A plurality of signal bus-lines 22 are vertically disposed on the substrate by insulating electrically to the scanning lines 21 and the first electrode bus-lines 25 at the respective crossing portions. A second electrode bus-line 50 is disposed in parallel and adjacent to the signal bus-line 22 by insulating electrically to the scanning lines 21 and the first electrode bus-lines 25 at the respective crossing portions. A transistor 31, as a non-linear switching device, is disposed adjacent to an area surrounded by the signal bus-line 22, the scanning bus-line 21, the first electrode bus-line 25 and the second electrode bus-line 50, and is coupled at the gate to the scanning bus-line 21 and coupled at the source to the signal bus-line 22. A display element 24 is mounted in the area and is connected between the drain of the transistor 31 and the second electrode bus-line 50. A storage capacitance 26 is connected across the junction of the transistor 31 and the display element 24 and the first electrode bus-line 25. Both the gates of the respective transistors 31 of the neighboring two display element 24 with respect to a scanning bus-line 21 are coupled to the scanning bus-line 21. Consequently, these two display units surrounded by an alternate long and short dash B are simultaneously driven by the scanning bus-line 21 and the signal bus-line 22.

In the fourth embodiment, in case that either of the two display elements has fallen in to malfunction, the other display element serves to display an image. Consequently lack of the image is prevented.

Figure 1E:
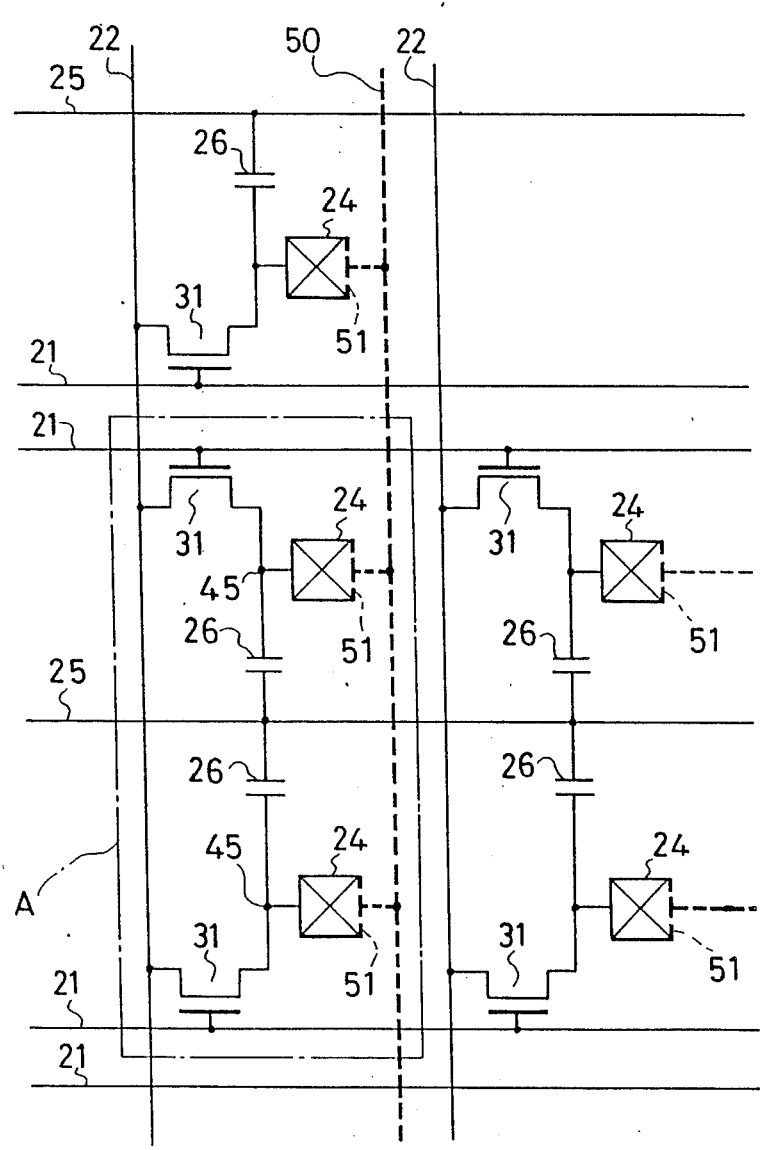
FIG. 1(e) is an equivalent circuit of the first embodiment using liquid crystal as a display element.
Figure 1F:
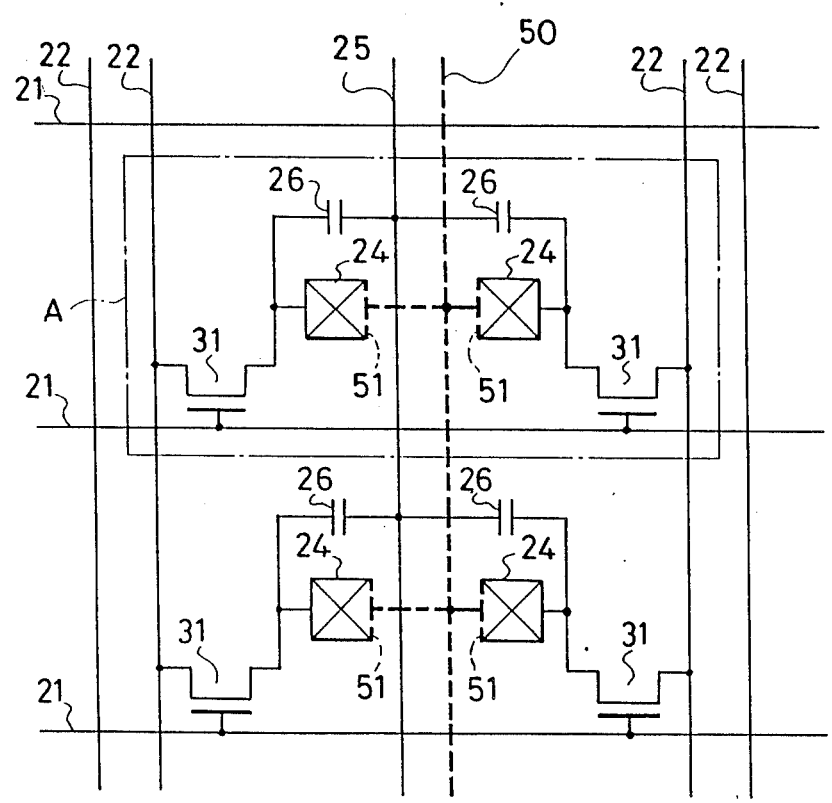
FIG. 1(f) is an equivalent circuit of the second embodiment using liquid crystal as a display element.
Figure 1G:
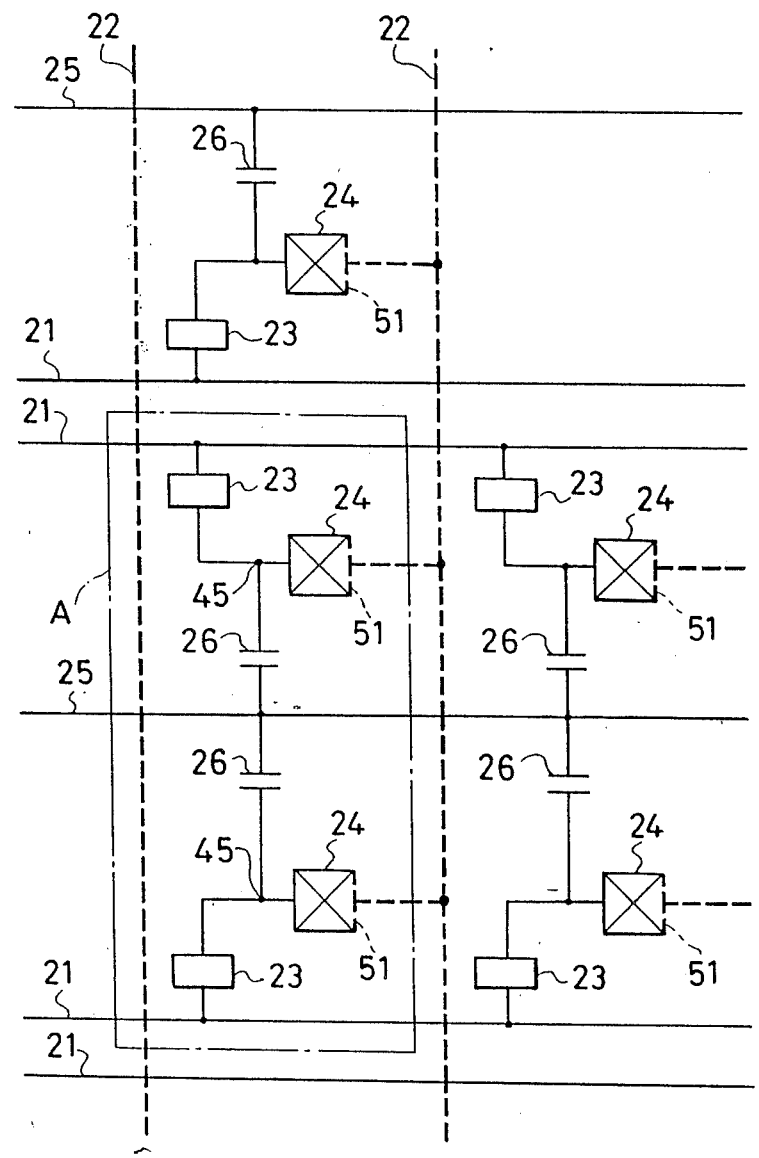
FIG. 1(g) is an equivalent circuit of the third embodiment using liquid crystal as a display element.
Figure 1H:
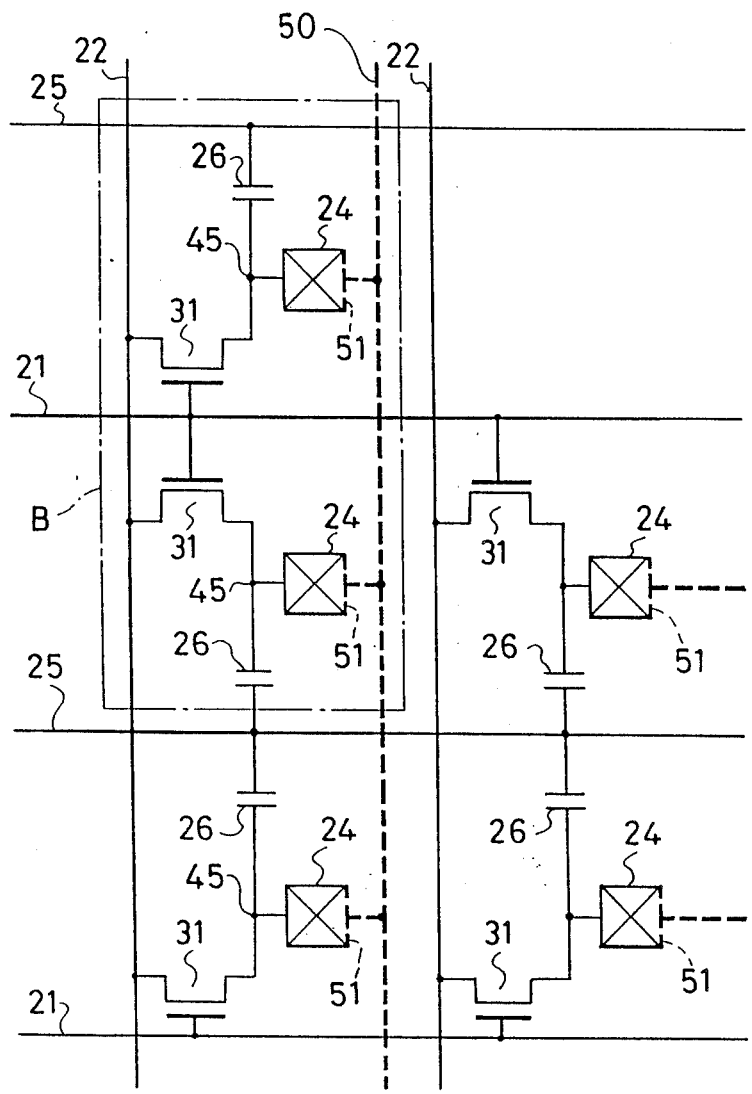
FIG. 1(h) is an equivalent circuit of the fourth embodiment using liquid crystal as a display element.

In case that a liquid crystal display element is used in these embodiments of the present invention, as shown in a side view of substrates of FIG. 2(b), the horizontal bus-lines such as the scanning line 21, the signal bus-line 22 and the first electrode bus-line 25 are formed on a first substrate 11, and the vertical bus-lines such as the second electrode bus-line 50 are formed on a second substrate 12. In an actual liquid crystal display element, a transparent electrode 51 of the liquid crystal display element is formed on the second substrate 12, and the second electrode bus-line 50 is formed in one body with the transparent electrode 51. Namely, both the second electrode bus-line 50 and the transparent electrode 51 are made by one layer on the second substrate 51 as shown by dotted lines in the equivalent circuits of FIG. 1(e), FIG. 1(f) and FIG. 1(h). The signal bus-line 22 is disposed on the first substrate 11 in case that a transistor is used as the non-linear device, but the signal bus-line 22 is made in one body with the second electrode bus-line 50 and is disposed on the second substrate 12 as shown by dotted line in FIG. 1(g) in case that a diode is used as the non-linear device.

Figure 2C:
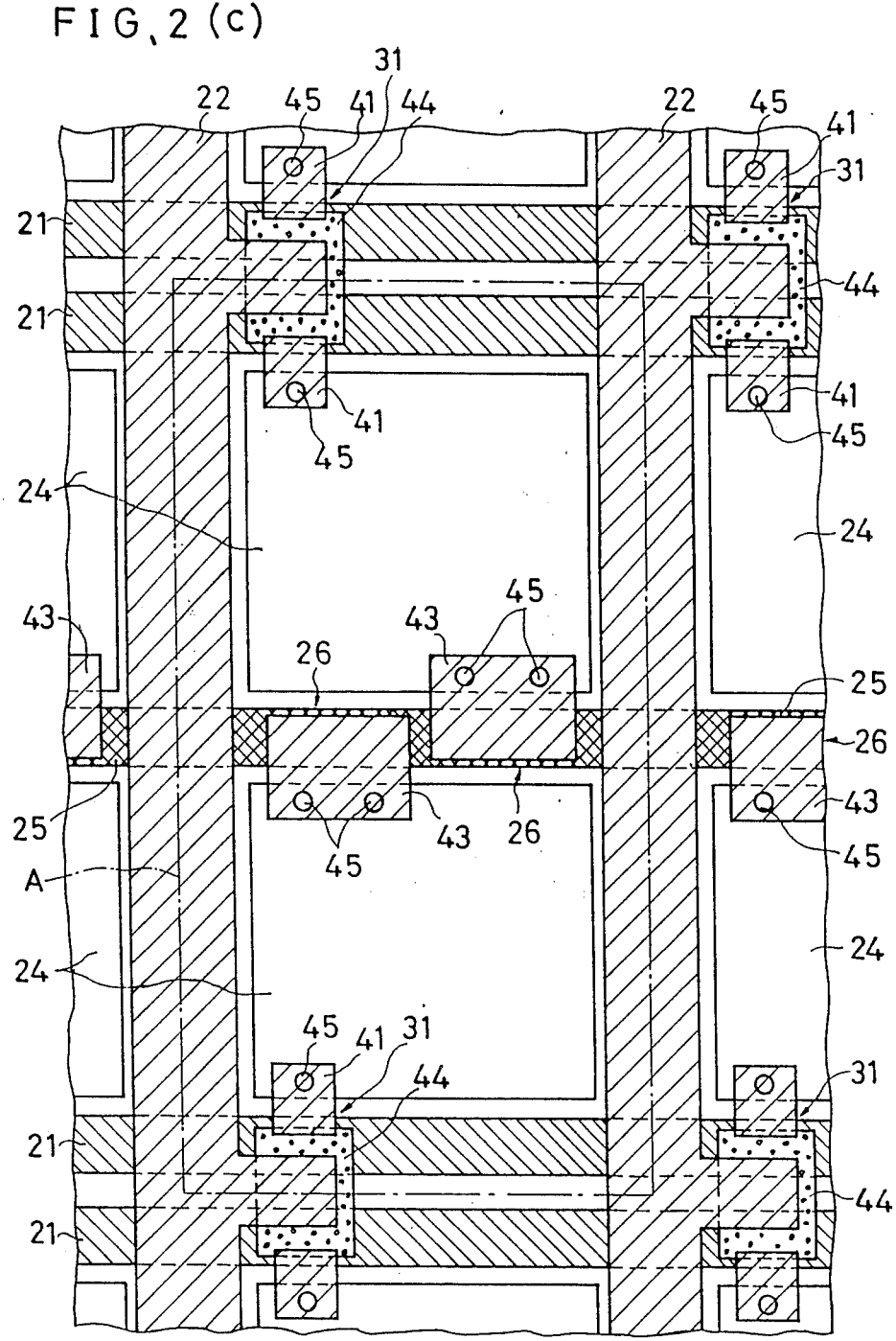

FIG. 2(c) shows a part of an actual circuit pattern of the electro-optical effect display apparatus using a liquid display element. In this embodiment, the area of the display element 24 also increases, and the percentage of the total area of all the display elements 24 with respect to the area of the display apparatus reaches 48%. Consequently, higher quality image is realized in the display according to the present invention.

In these embodiments of the present inventin as shown in FIG. 1(a), FIG. 1(b) and FIG. 1(d), two driving voltages which are in opposite phase relation each other are applied across the signal bus-line 22 and the scanning bus-line 21, and across the scanning bus-line 21 and the second electrode bus-line 50, respectively at an instant of operation of the display apparatus, for example. Consequently, the power source of a relatively lower voltage is usable, and power consumption decreases.

Furthermore, in these embodiments, the same voltage is applied to the first electrode bus-line 25 and the second electrode bus-line 50 in "normal black operation". Thus, the display element in malfunction due to a short-circuit of the capacitor 26, for example, is held in the opaque state, and the defect of the display element is not conspicuous.

The respective display elements are arranged on the substrate 10 in such a manner that the distance between the respective centers of gravity of the plan views of the display elements neighboring to each other are made to be identical with each other, in order to realize uniform lightness in operation of display.

As mentioned above, according to the present invention, the proportion of the total area of the display elements 24 to the area of the display apparatus is increased because of reduction of a bus-line, and "opposite-phase driving" is applicable to the display apparatus.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. Display apparatus comprising:
   a plurality of scanning bus-lines disposed horizontally on a substrate with a predetermined interval,
   a plurality of signal bus-lines disposed vertically on said substrate, electrically insulated from said scanning bus-lines at respective crossing, with another predetermined interval,
   first electrode bus-lines respectively disposed between adjacent scanning bus-lines,
   second electrode bus-lines respectively disposed in parallel with and adjacent to said signal bus-line and being electrically insulated form said scanning bus-lines at respective crossings,
   non-linear devices, having non-linear voltage-current characteristics, disposed substantially adjacent to respective areas surrounded by respective signal bus-lines, respective scanning bus-lines, respective first electrode bus-lines and respective second electrode bus-lines, whereby adjacent pairs of areas share a common first electrode bus-line, said devices being controlled by said respective signal bus-lines and said respective scanning bus-lines.
   electro-optical elements disposed in said respective areas and connected between respective non-linear devices and respective second electrode bus-lines to be controlled by said respective non-linear devices, and
   storage capacitors disposed adjacent to said respective areas and connected between said common first electrode bus-lines and the connection between said respective non-linear devices and electro-optical elements.

2. A display apparatus comprising:
   a plurality of pairs of scanning bus-lines which are close together disposed horizontally with a predetermined interval on a substrate,
   a plurality of signal bus-lines disposed vertically with another predetermined interval on said substrate, electrically insulated from said scanning bus-lines at the crossings,
   first electrode bus-lines respectively disposed between one pair of scanning bus-lines and another pair of scanning bus lines neighboring to the one pair of scanning bus lines and electrically insulated from said signal bus-lines at the respective crossings,
   second electrode bus-lines disposed adjacent to said signal bus-lines and electrically insulated from said scanning bus-lines and said first electrode bus-lines at the respective crossings,
   non-linear devices, having non-linear voltage-current characteristics, respective devices disposed substantially adjacent to respective areas surrounded by respective signal bus-lines, respective scanning bus-lines, respective first electrode bus-lines and respective second electrode bus-lines, whereby adjacent pairs of areas share a common first electrode bus-line, said devices being controlled by said respective signal bus-lines and said respective scanning bus-lines,
   electro-optical elements disposed in said respective areas and connected between respective non-linear devices and respective second electrode bus-lines to be controlled by said respective non-linear devices, and
   storage capacitors disposed adjacent to said respective areas and connected between said common first electrode bus-lines and the connection between said respective non-linear devices and electro-optical elements.

3. A display apparatus comprising:
   a plurality of scanning bus-lines disposed on a first substrate of a liquid crystal display apparatus with a predetermined interval,
   a second substrate facing to said first substrate with a predetermined distance,
   a plurality of signal bus-lines disposed on said first substrate substantially perpendicular with respect to said scanning bus-lines and electrically insulated from said scanning bus-lines at respective crossings,
   first electrode bus-lines disposed between one scanning bus-line and a neighboring other scanning bus-line and electrically insulated from said signal bus-lines,
   transparent electrodes formed on said second substrate serving as second electrode bus-lines,
   non-linear devices having non-linear voltage-current characcteristics disposed substantially adjacent to corresponding areas surrounded by respective signal bus-lines respective scanning bus-lines, respective first electrode bus-lines and respective second electrode bus-lines, whereby adjacent pairs of areas share a common first electrode bus-line,
   electro-optical elements of liquid crystal disposed in said respective areas and connected to one electrode thereof to respective non-linear devices to be controlled by said respective non-linear devices, and
   storage capacitors disposed adjacent to said respective areas and connected between said common first electrode bus-lines and the connections between respective non-linear devices and respective liquid crystal display elements..

4. A display apparatus comprising:
   a plurality of pairs of scanning bus-lines which are close together disposed with a predetermined interval on a first substrate of a liquid crystal display element,
   a second substrate facing to said first substrate with a predetermined distance,
   a plurality of signal bus-lines disposed substantially perpendicular with respect to said scanning bus-lines on said first substrate and electrically insulated from said scanning bus-lines at respective crossings, the signal bus-lines having another predetermined interval, transparent electrodes formed on said second substrate serving as second electrode bus-lines, first electrode bus-lines disposed between one pair of scanning bus-lines and another pair of scanning bus lines neighboring to the one pair of scanning bus lines, non-linear devices having non-linear voltage-current characteristics disposed substantially adjacent to respective areas surrounded by respective signal bus-lines, respective scanning bus-lines, respective first electrode bus-lines and respective second electrode bus-lines, whereby adjacent pairs of areas share a common first electrode bus-line, said devices being controlled by said respective signal bus-lines and said respective scanning bus-line, electro-optical elements of liquid crystal disposed in corresponding respective areas and connected at one electrode to said respective non-linear devices to be controlled by said respective non-linear devices, and storage capacitors disposed adjacent to said respective areas and connected between said common first electrode bus-lines and the connection between said respective non-linear devices and liquid crystal display elements.

5. A display apparatus comprising:

a plurality of pairs of scanning bus-lines which are close together disposed horizontally with a predetermined interval on a substrate, a plurality of signal bus-lines disposed vertically with another predtermined interval on said substrate, electrically insulated from said first bus-lines at the crossings, first electrode bus-lines respectively disposed between one pair of scanning bus-lines and another pair of scanning bus lines neighboring to the one pair of scanning bus lines and electrically insulated from said signal bus-lines at the respective crossings, non-linear devices having non-linear voltage-current characteristics disposed substantially adjacent to respective areas surrounded by respective signal bus-lines, respective scanning bus-lines, and respective first electrode bus-lines, whereby abjacent pairs of areas share a common first electrode bus-line, said devices controlled by said respective signal bus-lines and said respective scanning bus-lines, electro-optical elements disposed in said respective areas and connected between said respective non-linear devices and said respective signal bus-lines to by controlled by said respective non-linear devices, and storage capacitors disposed adjacent to said respective areas and connected between said common first electrode bus-lines and the connection between said respective non-linear devices and said respective electro-optical elements.

6. A display apparatus comprising:

a plurality of pairs of scanning bus-lines which are close together disposed with a predetermined interval on a first substrate of a liquid crystal display element, a second substrate facing to said first substrate with a predetermined distance, a plurality of transparent signal bus-lines disposed vertically on said first substrate, first electrode bus-lines disposed between one pair of scanning bus-lines and another pair of scanning bus-lines neighboring to the one pair of scanning bus-lines, non-linear devices having non-linear voltage-current characteristics disposed substantially adjacent to respective areas surrounded by respective signal bus-lines, respective scanning bus-lines and respective first electrode bus-lines, whereby adjacent pairs of areas share a common first electrode bus-lines, said devices controlled by said respective signal bus-lines and said respective scanning bus-lines, electro-optical elements of liquid crystal disposed in respective areas and connected at one electrode to said respective non-linear devices to be controlled by said respective non-linear devices, and storage capacitors disposed adjacent to respective areas and connected between said common first electrode bus-line and the connection between said respective non-linear devices and respective liquid crystal display elements.

7. A display apparatus in accordance with claim 1, 2, 3, 4, 5 or 6, wherein:

one respective electrode of said respective storage capacitors is connected to respective common first electrode bus-lines, and the other electrode thereof is a conductive portion connected to said electro-optical element.

8. A display apparatus in accordance with claim 1, 2, 3, 4, 5 or 6, wherein:

respective distances between respective centers of gravity of respective areas of the display are substantially the same.

9. A display apparatus in accordance with claim 1, 2, 3, 4, 5 or 6, wherein:

said non-linear devices are thin film transistors.

10. A display apparatus in accordance with claim 1, 2, 3, 4 or 5, wherein:

a voltage applied to said first electrode bus-line is substantially equal to a voltage applied to said second electrode bus-line.

11. A display apparatus in accordance with claim 2 or 4, wherein:

said second electrode bus-line is disposed in parallel with and adjacent to said first electrode bus-line.

12. A display apparatus in accordance with claim 6, wherein:

a voltage applied to said scanning bus-line is substantially equal to a voltage applied to said signal bus-line.

* * * * *